United States Patent
Fahland et al.

(10) Patent No.: US 9,714,059 B2
(45) Date of Patent: Jul. 25, 2017

(54) ACTIVE SPLITTER FOR A MOTOR VEHICLE

(71) Applicant: GM GLOBAL TECHNOLOGY OPERATIONS LLC, Detroit, MI (US)

(72) Inventors: Jason D. Fahland, Fenton, MI (US); Joshua R. Auden, Brighton, MI (US); David Dominguez, Tucson, AZ (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/959,935

(22) Filed: Dec. 4, 2015

(65) Prior Publication Data

US 2017/0158259 A1 Jun. 8, 2017

(51) Int. Cl.
*B62D 35/00* (2006.01)
*B62D 37/02* (2006.01)

(52) U.S. Cl.
CPC ........... *B62D 35/005* (2013.01); *B62D 37/02* (2013.01); *B60W 2520/28* (2013.01)

(58) Field of Classification Search
CPC .............................. B62D 35/005; B62D 37/02
USPC ................. 296/180.5, 180.1, 181.5; 180/903
See application file for complete search history.

(56) References Cited

U.S. PATENT DOCUMENTS

| | | | |
|---|---|---|---|
| 5,090,766 A * | 2/1992 | Ito ........................... | B62D 37/02 296/180.5 |
| 8,100,460 B2 | 1/2012 | Butlin, Jr. et al. | |
| 8,727,423 B2 * | 5/2014 | Keyes .................... | B61D 17/02 296/180.5 |
| 9,102,366 B1 | 8/2015 | Kim et al. | |
| 9,266,571 B2 * | 2/2016 | D'Arcy ................ | B62D 35/005 |
| 9,381,957 B1 * | 7/2016 | Auden ................ | B62D 35/007 |
| 2007/0257512 A1 * | 11/2007 | Anderson ............. | B62D 35/00 296/180.1 |
| 2009/0115221 A1 | 5/2009 | Shinedling et al. | |
| 2010/0140976 A1 * | 6/2010 | Browne ............... | B62D 35/005 296/180.1 |

(Continued)

FOREIGN PATENT DOCUMENTS

DE 102008011178 A1 * 8/2009
DE 102014111074 A1 * 2/2016

(Continued)

OTHER PUBLICATIONS

Machine Translation of DE102008011178A1, printed from the EPO website Sep. 19, 2016.*

*Primary Examiner* — Jason S Morrow
(74) *Attorney, Agent, or Firm* — Quinn IP Law

(57) ABSTRACT

A splitter system for a vehicle includes a splitter body having a first splitter body. The vehicle includes a vehicle body arranged along a longitudinal body axis and having a first vehicle body end configured to face oncoming ambient airflow. The splitter body is moveably mounted at the first vehicle body end and generates an aerodynamic downforce on the first vehicle body end when the vehicle is in motion. The splitter system also includes a mechanism configured to selectively translate the splitter body along the longitudinal body axis away from the first vehicle body end into the incident airflow and toward the first vehicle body end out of the incident airflow. The translation of the splitter body by the mechanism in turn adjusts the aerodynamic downforce generated by the splitter body on the first vehicle body end.

7 Claims, 2 Drawing Sheets

(56) References Cited

U.S. PATENT DOCUMENTS

| | | | |
|---|---|---|---|
| 2011/0260499 A1* | 10/2011 | Li | B62D 35/005 |
| | | | 296/180.1 |
| 2015/0054302 A1* | 2/2015 | Yamaguchi | B62D 37/02 |
| | | | 296/180.1 |
| 2015/0149046 A1* | 5/2015 | Jeong | G01G 19/12 |
| | | | 701/49 |
| 2015/0166130 A1* | 6/2015 | Lee | B60R 19/38 |
| | | | 296/180.5 |
| 2016/0229467 A1* | 8/2016 | Miller | B62D 35/005 |

FOREIGN PATENT DOCUMENTS

| | | | |
|---|---|---|---|
| EP | 1052151 A2 | * | 11/2000 |
| JP | 402306886 A | * | 12/1990 |

* cited by examiner

ACTIVE SPLITTER FOR A MOTOR VEHICLE

TECHNICAL FIELD

The disclosure relates to an active splitter for enhancement of aerodynamics of a motor vehicle.

BACKGROUND

Aerodynamics is a significant factor in vehicle design, including automobiles. Automotive aerodynamics is the study of the aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in high-performance vehicles in order to improve vehicle traction and cornering abilities. The study is typically used to shape vehicle bodywork for achieving a desired compromise among the above characteristics for specific vehicle use.

A splitter is an aerodynamic device sometimes used to increase the amount of downforce at the front of the automobile. Typically, an incident airstream is brought to stagnation at the front of the vehicle above the splitter by an air dam, causing an area of high pressure. Below the splitter, the airstream is redirected away from the stagnation zone and is accelerated, causing the pressure to drop. Thus reduced, the pressure below the splitter combined with the high pressure above the splitter, creates downforce at the front end of the vehicle body. However, to the extent a splitter is effective in increasing downforce on the vehicle body, the splitter will generally also increase the vehicle's aerodynamic drag.

SUMMARY

A splitter system for a vehicle includes a splitter body having a first splitter body side and a second splitter body side. The vehicle includes a vehicle body arranged along a longitudinal body axis and having a first body end configured to face oncoming, i.e., incident, ambient airflow. The splitter body is configured for mounting at the vehicle's first body end to generate an aerodynamic downforce thereon when the vehicle is in motion. The splitter system also includes a mechanism configured to selectively translate the splitter body along the longitudinal body axis away from the first vehicle body end into the incident airflow and toward the first vehicle body end out of the incident airflow. The translation of the splitter body by the mechanism in turn adjusts the aerodynamic downforce generated by the splitter body on the first vehicle body end.

The splitter system may also include an electronic controller configured to regulate the mechanism.

The vehicle may also include a road wheel and the splitter system may further include a first sensor configured to detect a rotating speed of the road wheel and communicate the detected rotating speed of the road wheel to the controller.

The splitter system may also include a second sensor configured to detect a yaw rate of the vehicle body and communicate the detected yaw rate to the controller.

The splitter system may also include a third sensor configured to detect a velocity of ambient airflow relative to the vehicle and communicate the detected velocity of the ambient airflow to the controller.

The vehicle may additionally include a steering wheel and the splitter system may further include a fourth sensor configured to detect an angle of the steering wheel.

The controller may be configured to selectively translate, via the mechanism, the splitter body along the longitudinal body axis relative to the first vehicle body end during vehicle cornering in response to the detected yaw rate, the detected angle of the steering wheel, and at least one of the detected rotating speed of the road wheel and velocity of the ambient airflow, to thereby vary the aerodynamic downforce on the vehicle's first body end and control the detected yaw rate.

The controller may be additionally programmed to selectively translate, via the mechanism, the splitter body along the longitudinal body axis relative to the first vehicle body end according to a lookup table establishing a correspondence of magnitude of shift of the splitter body and a magnitude of the aerodynamic downforce generated by the splitter body on the vehicle's first body end.

The mechanism may include at least one of a linear actuator, a rotary actuator, and an electric motor.

A vehicle employing such a splitter system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
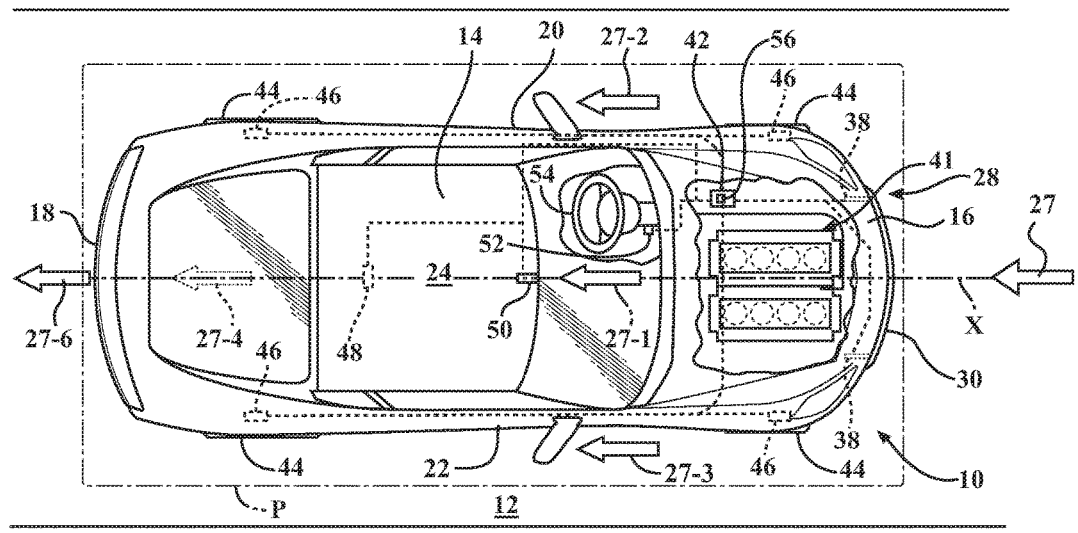
FIG. 1 is a schematic top view of a vehicle having a vehicle body arranged in a body plane along a longitudinal axis, and having a splitter system with a translating splitter body according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged in a body plane P that is substantially parallel to the road surface 12. The vehicle body 14 defines six body sides. The six body sides include a first body end or front end 16, an opposing second body end or rear end 18, a first lateral body side or left side 20, a second lateral body side or right side 22, a top body portion 24, which may include a vehicle roof, and an underbody portion (not shown).

The left side 20 and right side 22 are disposed generally parallel to each other and with respect to a virtual longitudinal axis X of the vehicle 10, and span the distance between the front end 16 and the rear end 18. The body plane P is defined to include the longitudinal axis X. A passenger compartment (not shown) of the vehicle 10 is generally bounded by the front and rear ends 16, 18 and the left and right sides 20, 22 of the body 14. As understood by those skilled in the art, the front end 16 is configured to face an oncoming, i.e., incident or approaching, ambient airflow 27 when the vehicle 10 is in motion relative to the road surface 12. When the vehicle 10 is in motion, the oncoming ambient airflow 27 moves substantially parallel to the body plane P and along the longitudinal axis X.

As the vehicle 10 moves relative to the road surface 12, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and the fourth airflow portion 27-4 passes under the vehicle body 14, between the underbody portion and the road surface 12. As understood by those skilled in the art, the recirculating airflow region 27-6 is generally caused at elevated vehicle speeds by the flow of surrounding air around the six body sides of the vehicle body 14.

Figure 2:
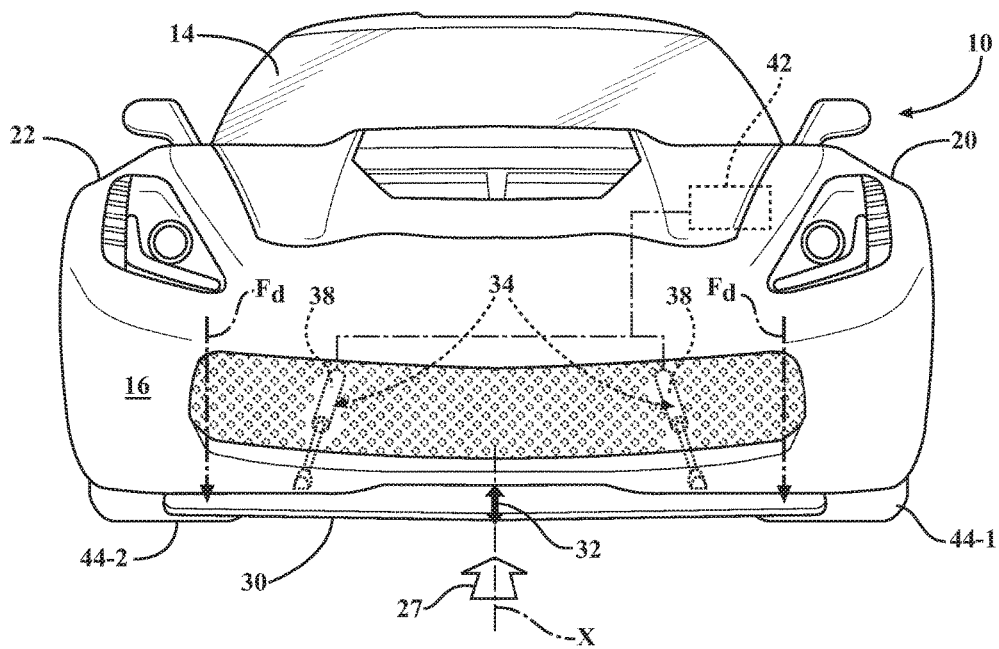
FIG. 2 is a schematic front view of the vehicle shown in FIG. 1, depicting the splitter translated into extended position to increase a downforce on the vehicle body, according to an embodiment the disclosure.

As shown in FIGS. 1 and 2, the vehicle 10 also includes a splitter system 28. The splitter system 28 includes a splitter body 30 arranged along a splitter body axis Y and configured to control a movement of the ambient airflow 27 along the longitudinal body axis X of the vehicle body 14. As shown, the splitter body 30 is mounted at the front end 16 to generate an aerodynamic downforce $F_d$ on the vehicle body 14 when the vehicle 10 is in motion. As understood, a pressure differential between the first airflow portion 27-1 and the fourth airflow portion 27-4 generated by the splitter body 30, with the pressure bias favoring the first airflow portion, determines the amount of aerodynamic downforce $F_d$ acting on the front end 16.

Figure 3:
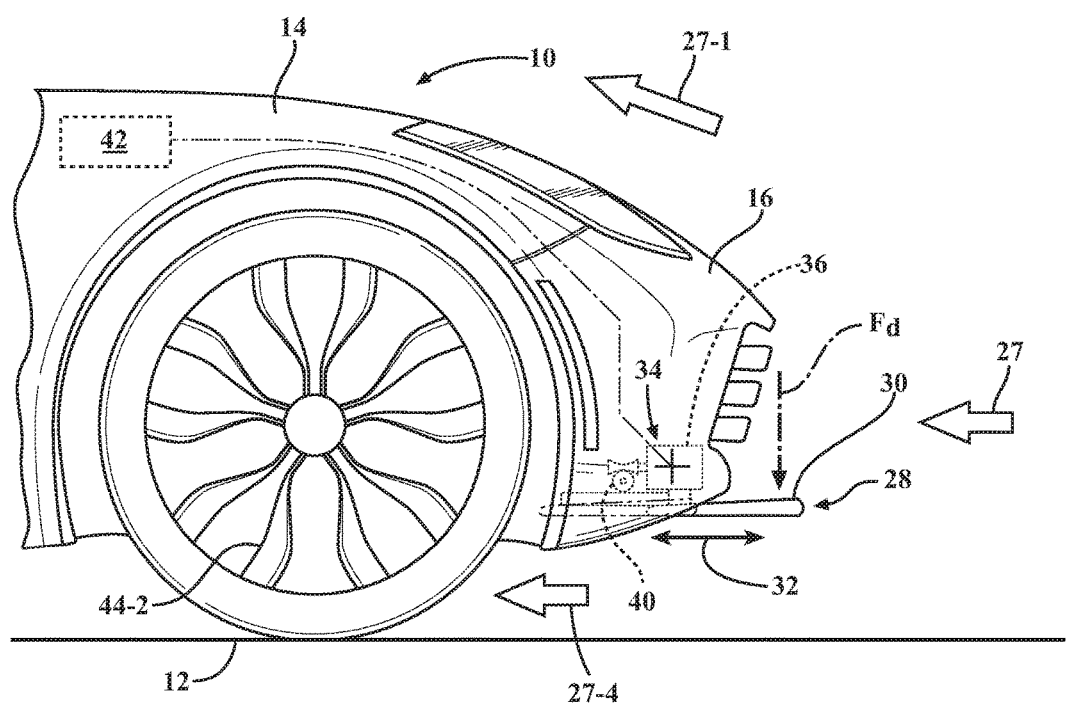
FIG. 3 is a schematic partial side view of the vehicle with the splitter translated into a retracted position according to the disclosure.

As shown in FIGS. 2-3, the splitter system 28 also includes a mechanism 34 configured to translate the splitter body 30 relative to the front end 16 in a direction 32 along the axis X and substantially parallel to the road surface 12. The mechanism 34 may include an actuator 38 configured to selectively translate the splitter body 30 relative to the front end 16. Such an actuator 38 can operate on an electro-mechanical principle, can be hydraulic or mechanical in nature, or employ a combination thereof. The mechanism 34 can additionally employ a gear-train 40 in connection with the actuator 38, or with an electric motor 36, as shown in FIG. 3, to affect the desired translation of the splitter body 30 relative to the front end 16.

As shown in FIGS. 1-2, the vehicle also includes an electronic controller 42 configured, i.e., constructed and programmed, to regulate the actuator 38 of the mechanism 34. The controller 42 may be configured as a central processing unit (CPU) configured to regulate operation of an internal combustion engine 41 (shown in FIG. 1), a hybrid-electric powertrain (not shown), or other alternative types of powerplants, as well as other vehicle systems, or a dedicated controller. In order to appropriately control operation of the mechanism 34, the controller 42 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 42 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 42 may also include a floppy disk, a flexible disk, hard disk, magnetic tape, any other magnetic medium, a CD-ROM, DVD, any other optical medium, etc. The controller 42 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 42 or accessible thereby may be stored in the memory and automatically executed to provide the required functionality.

As shown in FIG. 1, the vehicle 10 also includes road wheels, shown as a left front road wheel 44-1, a right front road wheel 44-2, a left rear road wheel 44-3, and a right rear road wheel 44-4. A plurality of first sensors 46 may be arranged on the vehicle body 14 for detecting rotating speeds of each road wheel 44-1, 44-2, 44-3, and 44-4. Each first sensor 46 may also be configured to communicate the detected rotating speed of the respective road wheel 44 to the controller 42, while the controller may be configured to correlate the data received from the respective first sensors to road speed of the vehicle 10. The vehicle 10 may also include a second sensor 48 configured to detect a yaw moment or rate on the vehicle body 14 relative to the road surface 12 and communicate the detected yaw rate to the controller 42. The vehicle may additionally include a third sensor 50 configured to detect a velocity of incident ambient airflow 27 relative to the vehicle 10 and communicate the detected velocity of the ambient airflow to the controller 42. The third sensor 50 may be a pitot tube configured to detect a pressure of the ambient airflow 27 at a specific location relative to the vehicle body 14, and the controller 42 can correlate the measured pressure to airflow velocity.

The controller 42 can also be configured to selectively translate the splitter body 30 via the actuator 38 during cornering of the vehicle 10 in response to the yaw rate detected by the second sensor 48. For example, if the vehicle 10 is negotiating a high-g turn, the splitter body 30 can be extended away from the front end 16 and out into the incident airflow 27. Such extension of the splitter body 30 into the incident airflow 27 ends to increase the aerodynamic downforce $F_d$ acting on the front road wheels 44-1, 44-2 and limit understeer of the vehicle 10, if such is necessary to enhance the ability of the vehicle to maintain a selected line through the turn. On the other hand, the splitter body 30 can be retracted toward or into the front end 16 and out of the incident airflow 27. Such retraction of the splitter body 30 out of the incident airflow 27 ends to decrease the aerodynamic downforce $F_d$ acting on the front road wheels 44 and limit oversteer of the vehicle 10, if such is necessary to enhance the ability of the vehicle to maintain a selected line through the turn. Accordingly, the position of the splitter body 30 can be regulated via the controller 42 relative to the road surface 12 proportionately to the yaw rate generated during cornering of the vehicle 10.

Furthermore, the controller 42 may be configured to selectively shift, via the mechanism 34, the splitter body 30 relative to the front end 16 in response to the rotating speeds of the road wheels 44-1, 44-2, 44-3, and 44-4 detected via the first sensor 46 and/or the velocity of the ambient airflow 27 detected via the third sensor 50. For example, if the vehicle 10 is traveling at an elevated road speed, the splitter body 30 can be translated away from the front end 16 into the oncoming airflow 27 to increase the aerodynamic downforce $F_d$ acting on the front road wheels 44-1, 44-2, and thereby enhance the stability and steering response of the vehicle at such conditions. On the other hand, the splitter body 30 can be translated toward or retracted into the front end 16 and out of the oncoming airflow 27 to decrease the downforce $F_d$, and, as a result, decrease aerodynamic drag of the vehicle 10.

The controller 42 may also be programmed to determine a slip of the vehicle 10 relative to the road surface 12. The slip of the vehicle 10 may include a measure of how much each of the road wheels 44 has slipped in a direction that is generally perpendicular to the longitudinal vehicle axis X, which identifies that the vehicle has deviated from an intended direction or path along the road surface 12. The intended direction of the vehicle 10 may be identified by the steering wheel angle, which can be detected by a fourth sensor 52 operatively connected to a steering wheel 54 (shown in FIG. 1) and communicated to the controller 42. Furthermore, the controller 42 may be programmed to compare the determined steering wheel angle and yaw rate to determine how much the vehicle has deviated from its intended direction or path. Accordingly, the controller 42 may also be configured to control the slip of the vehicle 10 relative to the road surface 12 by controlling the position of the splitter body 30 relative to the road surface 12 via the mechanism 34 in response to how much the vehicle has deviated from its intended path. The employed change in the position of the splitter body 30 then urges the vehicle 10 to return the actual vehicle heading to the desired heading being commanded by an operator of the vehicle at the steering wheel 54.

The controller 42 may be additionally programmed with a lookup table 56 establishing correspondence between the previously described vehicle parameters—the vehicle slip, yaw rate, vehicle road speed, and/or velocity of the airflow and appropriate position of the splitter body 30 for affecting appropriate regulation of the mechanism 34. Specifically, the lookup table 56 can establish a correspondence of magnitude of shift for the splitter body 30 and a magnitude of the aerodynamic downforce $F_d$ generated by the splitter system 28 on the front body end 16. The lookup table 56 may be developed empirically during validation and testing of the vehicle 10. As the position of the splitter body 30 is varied relative to the front end 16 during the cornering event or at elevated road speeds, the splitter system 28 can adjust the downforce $F_d$ at the front end 16 of the vehicle body 14 to affect the dynamic behavior of the vehicle 10.

Overall, control of the position of the splitter body 30 may be employed to maintain contact of the vehicle 10 with the road surface 12 at elevated speeds by countering aerodynamic lift of the vehicle body 14 in response to the velocity of ambient airflow 27 detected by the third sensor 50. Additionally, control of the position of the splitter body 30 may be employed to aid handling of the vehicle 10 in order to maintain the vehicle on its intended path by countering and controlling the yaw moment acting on the vehicle body 14 as detected by the second sensor 48.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A splitter system for a vehicle having a road wheel, a steering wheel, and a vehicle body arranged along a longitudinal body axis and including a first vehicle body end configured to face incident ambient airflow, the splitter system comprising:
   a splitter body configured to be moveably mounted at the first vehicle body end and generate an aerodynamic downforce on the first vehicle body end when the vehicle is in motion;
   a mechanism configured to selectively translate the splitter body along the longitudinal body axis away from the first vehicle body end into the incident airflow and toward the first vehicle body end out of the incident airflow to thereby adjust a magnitude of the aerodynamic downforce generated by the splitter body on the first vehicle body end;
   an electronic controller configured to regulate the mechanism;
   a first sensor configured to detect a rotating speed of the road wheel and communicate the detected rotating speed of the road wheel to the controller;
   a second sensor configured to detect a yaw rate of the vehicle body and communicate the detected yaw rate to the controller;
   a third sensor configured to detect a velocity of ambient airflow relative to the vehicle and communicate the detected velocity of the ambient airflow to the controller; and
   a fourth sensor configured to detect an angle of the steering wheel and communicate the detected angle of the steering wheel to the controller;
   wherein the controller is programmed to selectively translate, via the mechanism, the splitter body along the longitudinal body axis relative to the first vehicle body end during vehicle cornering in response to the detected yaw rate, the detected angle of the steering wheel, and at least one of the detected rotating speed of the road wheel and velocity of the ambient airflow, to thereby vary the aerodynamic downforce on the first vehicle body end and control the detected yaw rate.

2. The splitter system according to claim 1, wherein the controller is programmed to selectively translate, via the mechanism, the splitter body along the longitudinal body axis relative to the first vehicle body end according to a lookup table establishing a correspondence of magnitude of shift of the splitter body and a magnitude of the aerodynamic downforce generated by the splitter body on the first vehicle body end.

3. The splitter system according to claim 1, wherein the mechanism includes at least one of a linear actuator, a rotary actuator, and an electric motor.

4. A vehicle comprising:
   a vehicle body arranged along a longitudinal body axis and having a first vehicle body end configured to face incident ambient airflow;
   a road wheel;
   a steering wheel; and
   a splitter system having:

a splitter body configured to be moveably mounted at the first vehicle body end and generate an aerodynamic downforce on the first vehicle body end when the vehicle is in motion;

a mechanism configured to selectively translate the splitter body along the longitudinal body axis away from the first vehicle body end into the incident airflow and toward the first vehicle body end out of the incident airflow to thereby adjust a magnitude of the aerodynamic downforce generated by the splitter body on the first vehicle body end; and an electronic controller configured to regulate the mechanism;

a first sensor configured to detect a rotating speed of the road wheel and communicate the detected rotating speed of the road wheel to the controller;

a second sensor configured to detect a yaw rate of the vehicle body and communicate the detected yaw rate to the controller;

a third sensor configured to detect a velocity of ambient airflow relative to the vehicle and communicate the detected velocity of the ambient airflow to the controller; and a fourth sensor configured to detect an angle of the steering wheel and communicate the detected angle of the steering wheel to the controller;

wherein the controller is programmed to selectively translate, via the mechanism, the splitter body along the longitudinal body axis relative to the first vehicle body end during vehicle cornering in response to the detected yaw rate, the detected angle of the steering wheel, and at least one of the detected rotating speed of the road wheel and velocity of the ambient airflow, to thereby vary the aerodynamic downforce on the first vehicle body end and control the detected yaw rate.

5. The vehicle according to claim 4, wherein the controller is programmed to selectively translate, via the mechanism, the splitter body along the longitudinal body axis relative to the first vehicle body end according to a lookup table establishing a correspondence of magnitude of shift of the splitter body and a magnitude of the aerodynamic downforce generated by the splitter body on the first vehicle body end.

6. The vehicle according to claim 4, wherein the mechanism includes at least one of a linear actuator, a rotary actuator, and an electric motor.

7. A vehicle comprising:
a vehicle body arranged along a longitudinal body axis and having a first vehicle body end configured to face incident ambient airflow;
a road wheel;
a steering wheel; and
a splitter system having:
    a splitter body configured to be moveably mounted at the first vehicle body end and generate an aerodynamic downforce on the first vehicle body end when the vehicle is in motion; and
    a mechanism configured to selectively translate the splitter body along the longitudinal body axis away from the first vehicle body end into the incident airflow and toward the first vehicle body end out of the incident airflow to thereby adjust a magnitude of the aerodynamic downforce generated by the splitter body on the first vehicle body end; and
an electronic controller configured to regulate the mechanism;
a first sensor configured to detect a rotating speed of the road wheel and communicate the detected rotating speed of the road wheel to the controller;
a second sensor configured to detect a yaw rate of the vehicle body and communicate the detected yaw rate to the controller;
a third sensor configured to detect a velocity of ambient airflow relative to the vehicle and communicate the detected velocity of the ambient airflow to the controller; and
a fourth sensor configured to detect an angle of the steering wheel;
wherein the controller is configured to selectively translate, via the mechanism, the splitter body along the longitudinal body axis relative to the first vehicle body end during vehicle cornering in response to the detected yaw rate, the detected angle of the steering wheel, and at least one of the detected rotating speed of the road wheel and velocity of the ambient airflow according to a lookup table establishing a correspondence of magnitude of shift of the splitter body and a magnitude of the aerodynamic downforce generated by the splitter body on the first vehicle body end, to thereby vary the aerodynamic downforce on the first vehicle body end and control the detected yaw rate.

\* \* \* \* \*